United States Patent [19]
Rozzi et al.

[11] 3,840,411
[45] Oct. 8, 1974

[54] SOLDER FLUX COMPOSITIONS

[75] Inventors: Tony R. Rozzi; Harry B. Laudenslager, Jr., both of Jamestown, N.Y.

[73] Assignee: Blackstone Corporation, Jamestown, N.Y.

[22] Filed: June 14, 1972

[21] Appl. No.: 262,738

[52] U.S. Cl. ................................................ 148/23
[51] Int. Cl. ........................................ B23k 35/34
[58] Field of Search ...................................... 148/23

[56] References Cited
UNITED STATES PATENTS

| | | | |
|---|---|---|---|
| 2,880,125 | 3/1959 | Jordan | 148/23 |
| 2,978,369 | 4/1961 | Battle | 148/23 |
| 3,478,414 | 11/1969 | Potter | 148/23 |
| 3,675,307 | 7/1972 | Strauss | 148/23 |

*Primary Examiner*—Hyland Bizot
*Assistant Examiner*—Peter D. Rosenberg
*Attorney, Agent, or Firm*—Buell, Blenko & Ziesenheim

[57] ABSTRACT

A solder flux is provided comprising the reaction product of an acid halide and an amine.

10 Claims, No Drawings

SOLDER FLUX COMPOSITIONS

This invention relates to solder flux compositions and particularly to new active fluxing agents for soft solders based upon the reaction products of benzoyl chloride and an amine.

The problems involved in fluxing soft solders are well known and recognized. Many fluxes have been proposed based upon inorganic acids and to a limited extent upon organic acids. One of the problems which has not been completely solved is the production of a flux suitable for use with organic based soft soldering compounds such as the side seam compounds utilized in soldering tin cans which must be cleaned with organic based solvent systems and leave no significant residue. At the same time, the flux must have a satisfactory spread value so that solder will flow freely and wet the area to be fluxed. Prior to the present invention there has been no completely satisfactory flux for this purpose.

The present invention provides a new active organic fluxing agent for soft solders which can be used with resinous side seam compounds used in soldering tin cans and which is compatible with the organic based solvent systems used in cleaning such tin cans.

The soldering flux of the present invention comprises the reaction product of an acid halide and an amine either alone or admixed with other organic fluxing agents. The acid halide is preferably a chloride, e.g. benzoyl chloride. The amine is preferably a primary or secondary amine, e.g. secondary butylamine.

The composition of the reaction product is not fully understood, however, the reaction product appears to be substantially uniform and operable when made in various manners. For example, we have produced the reaction product of the same acid halide and amine in different ways with equally satisfactory results as will appear hereafter. We believe that the reaction product is predominantly a mixture of an amine hydrochloride, an amide and a small amount of amide hydrochloride. We believe that the reaction goes along the line:

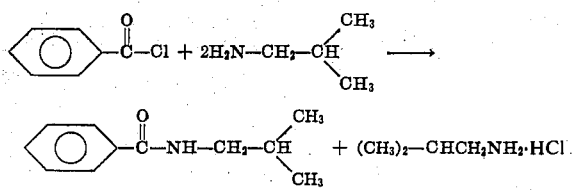

While the foregoing appears to be the path of reaction, we do not wish to be bound thereby but only postulate the same to indicate what appears to be the reasonable reaction path and products. We do know that if an acid halide and amine are caused to react they will produce a product effective as a soldering flux.

We have found that the primary and secondary amines are to be preferred in making the product for the reason that the reaction time becomes slower as the size of the amine increases. This can be overcome by adding a driving force such as heat but this is generally undesirable and can be avoided by using only the primary and secondary amines.

The invention can perhaps be better understood by referring to the following examples of the method and product of this invention.

EXAMPLE I 10 milliliters of benzoyl chloride were poured into a three neck reaction flask containing 100 milliliters of ether. The reaction flask was fitted with a condenser and a separatory funnel. Secondary butylamine was added to the benzoyl chloride-ether solution dropwise through the separatory funnel while stirring with a magnetic stirrer. The reaction proceeded vigorously with much spattering and popping. The reaction warmed very little since the heat was apparently dissipated rapidly in the ether solution. White crystals formed throughout the reaction. The ether was distilled off leaving an off-white crystalline material. This material in 10 percent isopropanol solution produced a spread of 90 percent on brass at 650°F. with 30/70 solder.

EXAMPLE II 10 milliliters of benzoyl chloride were placed in an Erlenmeyer flask and secondary butylamine was added dropwise thereto with constant stirring at ice bath temperature to reduce spattering. When fuming ceased the reaction was complete, leaving a white crystalline material. In 10 percent solution with isopropanol the reaction product exhibited a 90 percent spread on brass at 650°F. with 30/70 solder.

EXAMPLE III 10 milliliters of secondary butylamine were placed in an Erlenmeyer flask and benzoyl chloride added dropwise until reaction ceased precisely as in Example II. The resulting product appeared to be identical with that of Examples I and II and produced an identical spread value. In all cases we found that two mols of secondary butylamine were consumed for each mol of benzoyl chloride.

EXAMPLE IV 10 milliliters of benzoyl chloride were placed in an Erlenmeyer flask and normal butylamine was added dropwise until fuming ceased using ice bath temperatures. The resulting product was a pasty off-white material. A 10 percent solution of the reaction product in isopropanol produced an 89 percent spread on brass at 650°F. using 30/70 solder.

EXAMPLE V

The reverse of Example IV was carried out, the benzoyl chloride being added to the normal secondary amine. The product was identical with that of Example IV and produced a like spread value.

EXAMPLE VI 10 milliliters of benzoyl chloride were placed in an Erlenmeyer flask and tertiary butylamine was added thereto dropwise until reaction ceased. The product was a white solid. A 10 percent solution in isopropanol produced a 91 percent spread on brass at 650°F. with 30/70 solder.

EXAMPLE VII

Benzoyl chloride was reacted with a series of amines to compare the effectiveness of the reaction product. The reaction products were made into 10 percent solution in isopropanol and the spread test measured at 600°F. using 30/70 solder on brass with the following results:

| Amine | Spread Value |
|---|---|
| normal propylamine | 92 |
| 2-ethylhexylamine | 86 |
| tri-normal-butylamine | 78 |
| normal methylbutylamine | 84 |
| normal butylamine | 89 |
| secondary butylamine | 89.4 |
| tertiary butylamine | 90 |
| 2 methylamineethanol | 88 |
| di-iso propylamine | 89 |

While we have used benzoyl chloride as the acid halide in the foregoing examples, other acid halides such as octanoyl chloride, butyryl chloride, nonoyl chloride and the like will also produce a satisfactory fluxing agent.

In the foregoing examples we have used isopropanol as the solvent for the reaction product, however, it should be noted that the reaction product may be used alone or dissolved in other suitable solvents or mixtures of solvents and other fluxing agents such as rosin. Among the solvents we have used are dimethylformamide, ethyl lactate, mixtures of dimethylformamide and ethyl lactate, all with and without small amounts of glycerine, and isopropanol and rosin mixtures, e.g. 10 percent rosin and 90 percent isopropanol.

In each case where we refer to 30/70 solder we mean a solder of 30 percent Sn and 70 percent Pb.

It will be seen from the foregoing examples that the reaction product of an acid halide and an amine is a highly effective fluxing agent and may take a variety of forms. Thus, while we have set out certain preferred practices and embodiments of our invention in the foregoing specification, it will be understood that this invention may be otherwise embodied within the scope of the following claims.

We claim:

1. A solder flux comprising the reaction product of an organic acid halide and an amine.

2. A solder flux as claimed in claim 1 wherein the acid halide is a member selected from the group consisting of benzoyl chloride, octanoly chloride, butyryl chloride and monoyl chloride.

3. A solder flux as claimed in claim 1 wherein the acid halide is benzoyl chloride.

4. A solder flux as claimed in claim 1 wherein the amine is a primary amine.

5. A solder flux as claimed in claim 1 wherein the amine is a secondary amine.

6. A solder flux as claimed in claim 1 wherein the amine is a tertiary amine.

7. A solder flux as claimed in claim 1 wherein the amine is secondary butylamine.

8. A solder flux as claimed in claim 1 wherein the reaction product is dissolved in an organic solvent therefor.

9. A solder flux as claimed in claim 8 wherein the solvent is isopropanol.

10. A solder flux as claimed in claim 8 wherein the solvent is a mixture of 10 percent rosin and 90 percent isopropanol.

* * * * *

UNITED STATES PATENT OFFICE
CERTIFICATE OF CORRECTION

PATENT NO. : 3,840,411
DATED : October 8, 1974
INVENTOR(S) : TONY R. ROZZI and HARRY B. LAUDENSLAGER, JR.

It is certified that error appears in the above-identified patent and that said Letters Patent are hereby corrected as shown below:

The claims should read as follows:

1. A solder flux comprising the reaction product of an organic acid halide selected from the group consisting of benzoyl chloride, octanoyl chloride, butyryl chloride and nonoyl chloride and an amine.

2. A solder flux as claimed in claim 1 wherein the organic acid halide is benzoyl chloride.

3. A solder flux as claimed in claim 1 wherein the amine is a member of the group consisting of primary and secondary amines.

4. A solder flux as claimed in claim 1 wherein the reaction product is dissolved in an organic solvent therefor.

5. A solder flux as claimed in claim 4 wherein the solvent is a mixture of 10% rosin and 90% isopropanol.

UNITED STATES PATENT OFFICE
CERTIFICATE OF CORRECTION

PATENT NO. : 3,840,411

DATED : October 8, 1974

INVENTOR(S) : TONY R. ROZZI and HARRY B. LAUDENSLAGER, JR.

It is certified that error appears in the above-identified patent and that said Letters Patent are hereby corrected as shown below:

6. The method of fluxing solder which comprises applying to the area to be soldered a reaction product of an organic acid halide and an amine.

7. The method as claimed in claim 6 wherein the organic acid halide is a member selected from the group consisting of benzoyl chloride, octanoyl chloride, butyryl chloride and nonoyl chloride.

8. The method as claimed in claim 6 wherein the organic acid halide is benzoyl chloride.

9. The method as claimed in claim 6 wherein the amine is a member selected from the group primary and secondary amines.

10. The method as claimed in claim 6 wherein the reaction product is first dissolved in an organic solvent therefor and applied to the area to be soldered.

Signed and Sealed this

Fifteenth Day of November 1977

[SEAL]

Attest:

RUTH C. MASON
Attesting Officer

LUTRELLE F. PARKER
Acting Commissioner of Patents and Trademarks